US006614808B1

(12) United States Patent
Gopalakrishna

(10) Patent No.: US 6,614,808 B1
(45) Date of Patent: Sep. 2, 2003

(54) NETWORK PACKET AGGREGATION

(75) Inventor: Rajendra Arcot Gopalakrishna, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,867

(22) Filed: Sep. 2, 1999

(51) Int. Cl.$^7$ ............................................. H04L 12/56
(52) U.S. Cl. ........................ 370/469; 370/471; 370/474
(58) Field of Search ................................. 370/392, 393, 370/400, 466, 467, 475, 389, 391, 401, 469, 470, 471, 473, 402, 465, 474; 709/203, 227, 231

(56) References Cited

U.S. PATENT DOCUMENTS

| 5,278,834 A | * | 1/1994 | Mazzola | 370/94.1 |
|---|---|---|---|---|
| 5,293,615 A | | 3/1994 | Amada | 395/600 |
| 5,519,859 A | | 5/1996 | Grace | 395/600 |
| 5,627,829 A | | 5/1997 | Gleeson et al. | 370/230 |
| 5,657,460 A | | 8/1997 | Egan et al. | 395/326 |
| 5,774,660 A | | 6/1998 | Brendel et al. | 395/200.31 |
| 5,842,018 A | | 11/1998 | Atkinson et al. | 395/700 |
| 5,848,406 A | | 12/1998 | Mani et al. | 707/2 |
| 5,856,974 A | * | 1/1999 | Gervais et al. | 370/392 |
| 5,897,649 A | | 4/1999 | Kennedy | 707/538 |
| 5,951,694 A | * | 9/1999 | Choquier et al. | 709/203 |
| 5,991,302 A | * | 11/1999 | Berl et al. | 370/400 |
| 6,003,089 A | * | 12/1999 | Shaffer et al. | 370/402 |
| 6,026,080 A | * | 2/2000 | Roy | 370/260 |

OTHER PUBLICATIONS

"Internetworking with TCP/IP vol. 1" by Douglas E. Comer (published 1995 by Prentice–Hall, Inc.).*
PCT Notification of Transmittal of the International Search Report or the Declaration, Dec. 27, 2000. (2 parts).
PCT Notification of Transmittal of the International Search Report or the Declaration, Feb. 22, 2001.
Gopalakrishna et al., "Connection Server Performance Evaluation", Partner Development, version 2.0, Jun. 9, 1999, 16 pgs.
Gopalakrishna, "An Efficient Network Packet Aggregation across Client Sessions/Users using minimum Operating System Communication interfaces", Infromix Software Inc., 13 pgs.

* cited by examiner

Primary Examiner—Chau Nguyen
Assistant Examiner—Soon-Dong Hyun
(74) Attorney, Agent, or Firm—Romualdas Strimaitis; Michael Buchenhorner

(57) ABSTRACT

A system aggregates data packets communicated between one or more sessions on a source system and one or more sessions on a target system by: collecting one or more session packets from the one or more source system sessions; multiplexing the session data packets into an aggregated packet; sending the aggregated packet from the source system to the target system; and demultiplexing each aggregated packet into corresponding session packets for delivery to the sessions on the target system.

16 Claims, 9 Drawing Sheets

NETWORK PACKET AGGREGATION

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The ubiquity of network applications on wide area networks such as the Internet is driven in part by the robustness of communication protocols that control the location and exchange of data over the network. In these networks, information passing from one system to another is transmitted from layer to layer using one or more predefined protocols. Within each layer, predetermined services or operations are performed, and the layer transmission approach allows a given layer the ability to offer selected services to other layers using a standardized interface while shielding other layers from implementation details in the given layer.

For example, in one model called an open systems interconnection (OSI) reference model specified by the International Standards Organization (ISO), seven layers known as "physical", "data link", "network", "transport", "session", "presentation" and "application" layers are specified.

Processes carried out in the physical layer are concerned with the transmission of raw data bits over a communication channel. Processes carried out in the data link layer manipulate the raw data bit stream and transform it into a data stream that appears free of transmission errors. The latter task is accomplished by breaking the transmitted data into data frames and transmitting the frames sequentially accompanied with error correcting mechanisms for detecting or correcting errors.

Network layer processes determine how data packets are routed from a data source to a data destination by selecting one of many alternative paths through the network. The function of the transport layer processes is to accept a data stream from a session layer, split it up into smaller units (if necessary), pass these smaller units to the network layer, and to provide appropriate mechanisms to ensure that the units all arrive correctly at the destination, with no sequencing errors, duplicates or missing data.

Session layer processes allow users on different machines to establish "sessions" or "dialogues" between themselves. A session allows ordinary data transport between the communicating nodes, but also provides enhanced services in some applications, such as dialogue control, token management and synchronization. Presentation layer processes perform certain common functions that are requested sufficiently often to warrant finding a general solution for them, for example, encoding data into a standard format, performing encryption and decryption and other functions.

Finally, the application protocol layer processes handle a variety of protocols that are commonly needed, such as database access, file transfer, among others. The layers are arranged in order to form a protocol "stack" for each node and the stacks are connected together at the physical level end. Thus, data transmission through the network consists of passing information down through one stack in a source system across the physical communication link to another protocol stack and passing the information up the other stack to a target system.

In one protocol called the Transmission Control Protocol/Internet Protocol (TCP/IP), a reliable, connection oriented protocol over (or encapsulated within) IP is provided. TCP guarantees the delivery of packets, ensures proper sequencing of the data, and provides a checksum feature that validates both the packet header and its data for accuracy. The protocol specifies how TCP software distinguishes among multiple destinations on a given system, and how communicating systems recover from errors (such as lost or duplicated packets. It provides a best-effort, connectionless delivery system for computer data. TCP/IP is a four-layered system with an application layer, a transport layer, a network layer, and a link layer. In TCP/IP, each layer has one or more protocols for communicating with its peer at the same layer. For example, two TCP layers running on a network can communicate with each other. The hardware details associated with physically interfacing with a cable/media are defined at the link layer. The network layer, sometimes called the Internet layer, handles the movement of packets around the network. The Internet protocol provides the network layer in the TCP/IP protocol suite. The transport layer provides a flow of data between two hosts for the application layer above. The application layer handles the details of the particular application. Examples of the application layer include remote login applications such as telnet, file transfer protocols (FTP) application, and the simple mail transfer protocol (SMTP) for electronic mail, among others.

When an application sends data using TCP, the data is sent down a protocol stack through each layer, until the data reaches the physical layer where it is sent as a stream of bits across a network. Each layer adds information to the data by prepending headers and/or trailer information to the received data. The data that TCP sends to IP is called a TCP segment, while the data that IP sends to the network interface is called an IP datagram. The stream of bytes that flows across the network is called a frame. When the frame is received at a destination host, the frame works its way up the protocol stack. Along the way, the headers or trailers are removed by appropriate protocol handlers. This is done by examining identifiers in the headers or trailers (demultiplexing). In this manner, packets can be streamed one at time from a source to a destination.

The transmission of individual packets over the network adds communication overhead to the protocol handlers such as the cost to issue a network send/receive/select system call to read/write/wait for each network packets. Network packet aggregation can be used to reduce the communication overhead in a client/server configuration. This technique typically uses a shared buffer that aggregates the packets and adds various headers/trailers to the aggregated packet prior to transmission. However, for systems that transmit small sized network packets such as those in a client-server database, the per-packet processing cost to send or receive a network packet such as the cost of handling headers and trailers becomes high relative to the payload's per-byte processing cost.

SUMMARY OF THE INVENTION

A system aggregates data packets communicated between one or more sessions on a source system and one or more sessions on a target system by: collecting one or more session packets from the one or more source system sessions; multiplexing the session data packets into an aggregated packet; sending the aggregated packet from the source system to the target system; and demultiplexing each aggregated packet into corresponding session packets for delivery to the sessions on the target system.

Implementations of the invention include one or more of the following. The method includes reading an aggregated packet header for each aggregated packet; allocating one or more network buffers based on the aggregated packet header; and scattering the session packets into the one or more network buffers. The method also includes generating a packet header based on the one or more session packets; and sending the packet header and the session packets as the aggregated packet on a data transport. The method can also include combining multiple packet headers into an aggregated packet header; sending the aggregated packet header over one or more control transports; combining multiple session packets into an aggregated data packet; and sending the aggregated data packet over one or more data transports. Additionally, the method can receive the aggregated packet header from the control transport; and for each packet header received from the aggregated packet header, allocate one or more network buffers based on the aggregated packet header; receive the aggregated data packet; and scatter the aggregated data packet into the one or more network buffers based on information from the aggregated packet header. The packet aggregation can also be cascaded, that is, a cascaded session can aggregate data from a previously aggregated session and forward the aggregated packet to a concentrator downstream which in turn performs additional aggregation on the aggregated packets in a cascaded fashion.

In another aspect of the invention, a method aggregates packets for transmission from one or more sessions on a source system to one or more sessions on a target system, each packet having a data portion and a header portion. This is done by collecting one or more packets from the source system; aggregating the header portion of each packet and one or more data portions into an aggregated packet; transmitting the aggregated packet to the target system; extracting the header portion from the aggregated packet; and demultiplexing the one or more data portions into corresponding one or more sessions on the target system based on the header portion.

Implementations of this aspect include one or more of the following. The aggregated header is transmitted together with one or more data portions. Multiple packet headers can be combined into an aggregated packet header. The aggregated header is transmitted over one or more control channels. The data portions are transmitted over one or more data channels. The demultiplexing executes one or more operating system input/output calls. The collecting step performs user input/output multiplexing. Moreover, each session is a database session, an Internet Protocol (IP) session, or an operating system stream.

Advantages of the invention include one or more of the following. The invention improves the utilization of the network bandwidth by aggregating network packets across unrelated client sessions/users to reduce the communication latency as well as the resource requirements to handle small sized network packets. Additionally, the invention obviates the need to perform data buffer copy operations to implement network packet aggregation at the application layer that would be otherwise necessary to achieve packet aggregation across client sessions. Further, the invention avoids resource expensive Input/Output Multiplexing Operating System calls such as Select( ), Poll( ), and IOCompletionPort( ) system calls traditionally used by server processes to concurrently service multiple network clients.

System performance is enhanced since the number of operating system calls needed to send and receive data over the network is reduced. Processor loading is reduced due to fewer I/O operations. Network packets can be aggregated even in relatively small configurations since aggregation reduces network latency. The aggregation of the network packets, along with the minimization of expensive I/O multiplexing calls reduces the processing resource requirements on the server. By aggregating network packets, the invention amortizes and reduces the network communication overhead such as the overhead associated with issuing network send/receive/select system calls. Moreover, the I/O multiplexing is performed at the user level, which eliminates expensive OS kernel calls to poll the transports to detect arriving packets.

Overall system complexity is reduced by avoiding complicated schemes such as buffer sharing. The invention provides high performance without requiring additional processor and memory resources for copying data. Hence, the scalability of the server is improved.

Other features and advantages will become apparent from the following description, including the drawings and the claims.

DESCRIPTION

Figure 1:
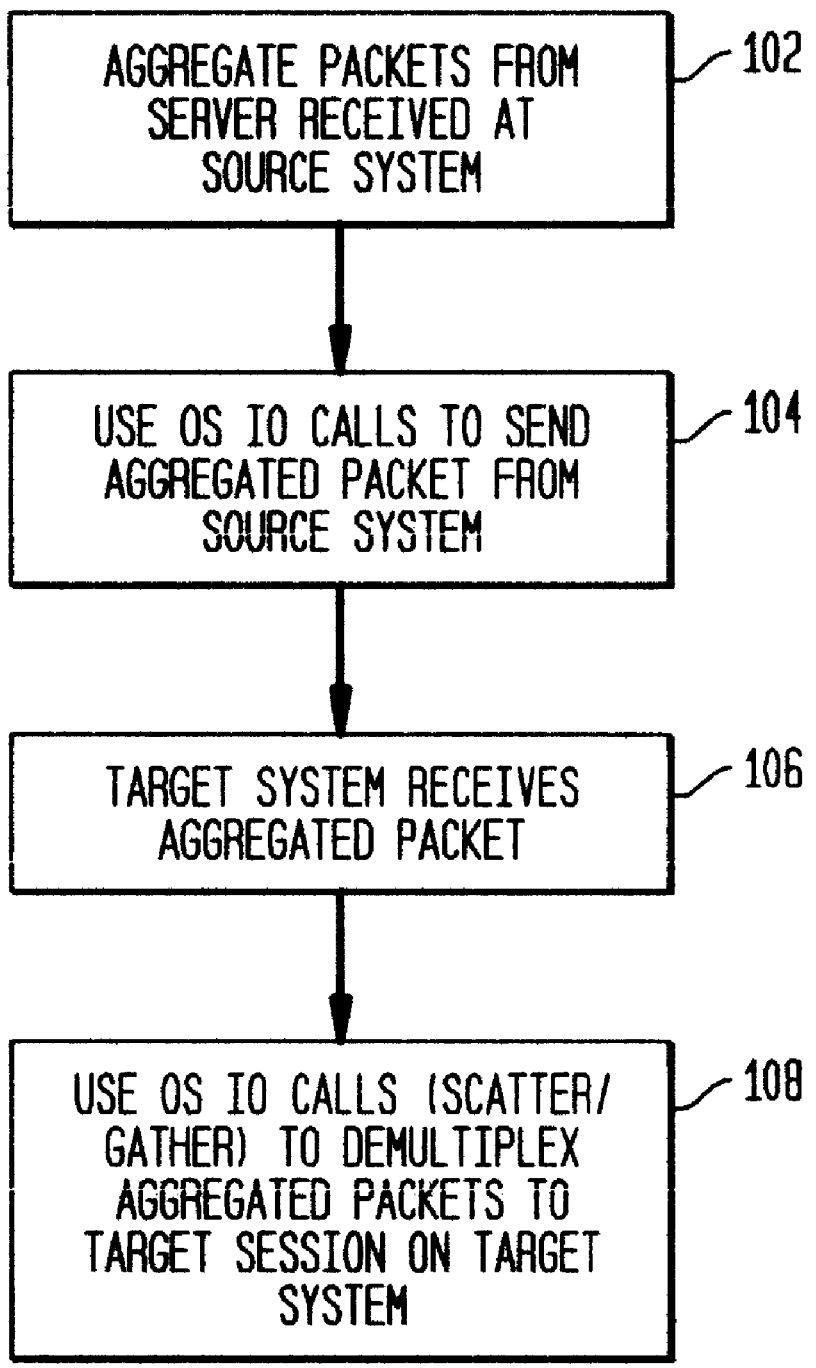
FIG. 1 is a flowchart of a process for performing network packet aggregation.
Figure 2:
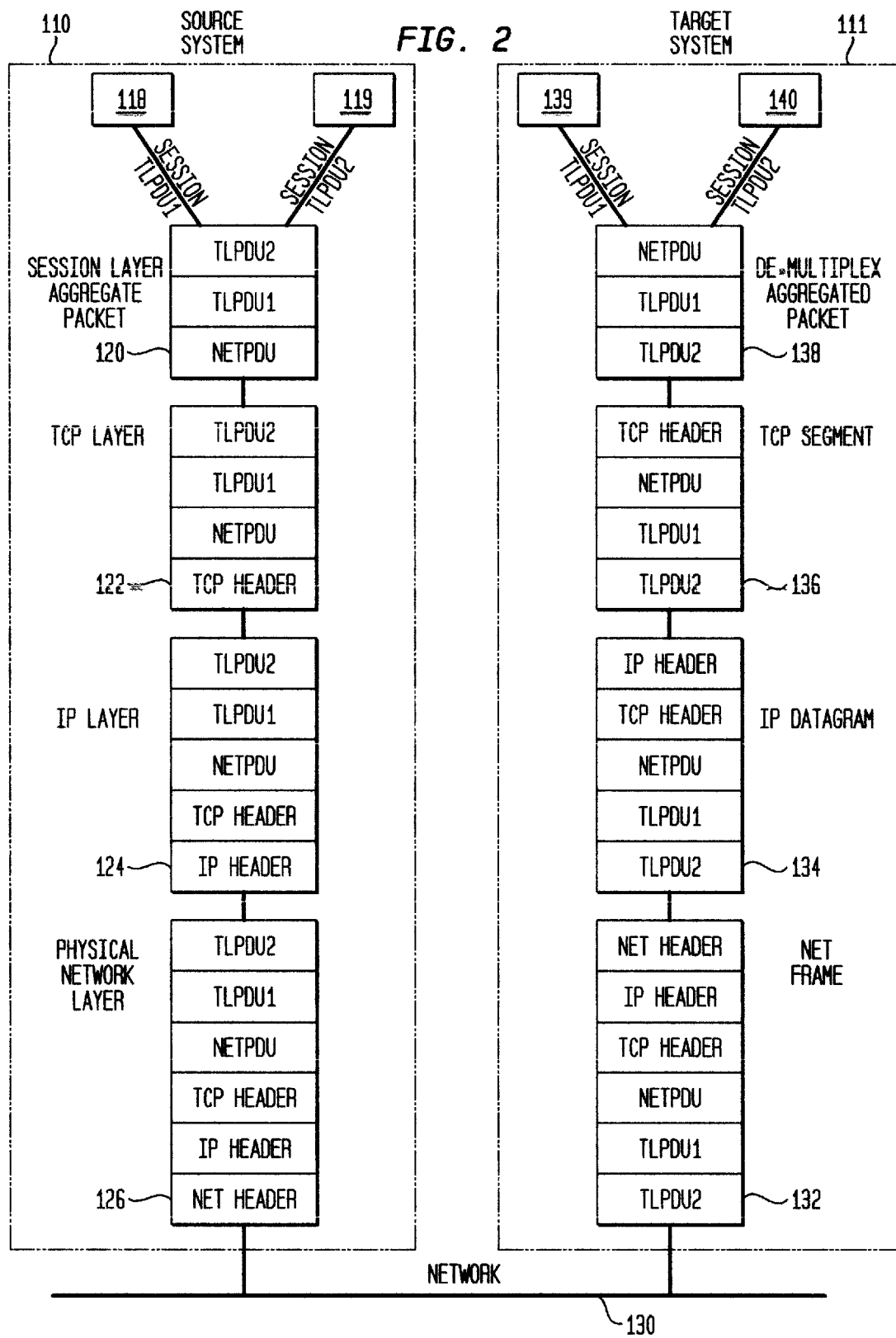
FIG. 2 is a block diagram illustrating an embodiment for encapsulating packets between one or more source sessions and one or more remote target sessions.

Referring to FIGS. 1 and 2, a process 100 for performing network packet aggregation over one or more client sessions is shown. In general, a packet format or frame format refers to how data is encapsulated with various fields and headers for transmission across a network. For example, a data packet typically includes a destination address field, a length field, an error correcting code (ECC) field or cyclic redundancy check (CRC) field, as well as headers and footers to identify the beginning and end of the packet.

In FIG. 1, one or more users or sessions at a source system 110 (FIG. 2) establish one or more connections to corresponding sessions executing on a target system 111 (FIG. 2). The sessions may run directly on the source system 110, or alternatively, may run on a remote system (not shown) whose connection requests have been transmitted to the source system 110. In one embodiment, one or more sockets are created during the establishment of the connections. Corresponding addresses or port numbers are bound to the sockets, and connections are initiated using connect calls.

Once the connections are established, data packets are sent from sessions on the source system 110 to sessions on the target system 111. The source system 110 receives the data packets and multiplexes the data packets into an aggregated packet, which can be communicated with minimal transmission overhead (step 102). The aggregated packet contains a plurality of data packets, as well as information needed to demultiplex the aggregated packet at the target system 111. In the embodiment of FIG. 1, the aggregated packets are then sent from the source system 110 to the target system 111 using one or more operating system input/output calls (step 104). The aggregated packets are then distributed over a plurality of data frames and sent over a network to the target system 111. When the data frames are received at the target system 111, the data frames are sent to a protocol stack. Headers contained in the packets are removed by one or more responsive protocol handlers. Each protocol handler examines certain identifiers in a packet's header to determine whether it should handle the packet or should forward the packet to the next layer. The target system 111 receives the aggregate packets of data (step 106) and demultiplexes each aggregated packet into its constituent sub-packets for delivery to the target sessions on the target system 111 using one or more operating system input/output calls (step 108). In one embodiment, an operating system provided scatter-gather interface is invoked. This embodiment receives the aggregated packet in one or more network buffers. Headers are then generated for each client session packet to regenerate the packet originally generated at the source system 110. An operating system provided scatter-gather interface such as writev( ) is called once to gather the output data from an input/output vector and to write the aggregated packets to a transport endpoint such as a socket. The scatter-gather interface allows a one step distribution of the individual session packet to its destination on the target system 111.

FIG. 2 shows interactions among various layers associated with the source system 110 and the target system 111 in generating aggregated packets and in demultiplexing the aggregated packets. A plurality of client sessions 118 and 119 send a plurality of session data packets which are combined into a session layer aggregated packet 120. The client sessions 118 and 119 can be database sessions communicating queries to and responses from a database server.

The session layer aggregated packet 120 includes one or more aggregated Transport Level Protocol Data Units (TLPDUs), along with a Network Protocol Data Unit (NetPDU) header. The NetPDU header describes the number of TLPDUs that will follow the header on the given transport. The NetPDU precedes the TLPDUs that it describes, and contains enough information for subsequent layers to demultiplex the aggregated packets. In one embodiment, the aggregated packet header is fixed in length. However, the maximum aggregation size (and hence the maximum packet header length) is negotiable at the physical transport establishment time.

The session data, which is shown exemplarily as TLPDU1 and TLPDU2 in the session layer aggregate packet 120, and the NetPDU header are then provided to a TCP layer 122. At this layer, a TCP header is added to the aggregated packet in addition to the NetPDU and the session data. The TCP layer 122 is then provided to an IP layer 124 which inserts an IP header into the aggregated packet previously emitted by the TCP layer 122. At the physical network layer 126, a network header is appended before the aggregated packet is transmitted over a network 130 as one or more frames of data.

The frames carrying the aggregated network packets are first processed by a network frame handler 132. The network frame handler 132 strips the network header from each frame and forwards the resulting packet to the next layer, which is the IP layer 134. In the IP layer 134, an IP datagram handler searches for an IP header and removes the IP header before forwarding the demultiplexed package onward to the next level, the TCP level 136. At the TCP level 136, a TCP segment handler examines the packets forwarded to it and locates a TCP header from the data packet. The TCP header is removed and the resulting data packet is then forwarded to a session layer 138 where an aggregated packet handler strips the net PDU header from the data packet and uses information from the NetPDU header to demultiplex the data packet and provide data to the corresponding target sessions 139 and 140.

Figure 3:
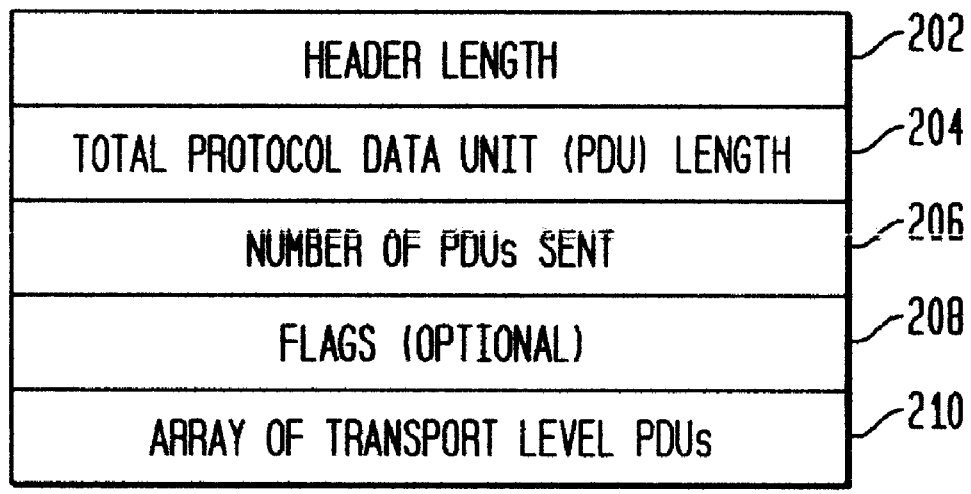
FIG. 3 is a block diagram illustrating one embodiment of a network packet header in accordance with the invention.

Referring now to FIG. 3, an exemplary data structure of the NetPDU 200 is shown in detail. The NetPDU 200 includes a header length field 202, a total protocol data unit length field 204, a PDU-sent count field 206, a flag field 208, and one or more transport level PDUs (TLPDUs) 210. The header length field 202 is optional and allows the network application to negotiate an increase or decrease in the size of the header. In embodiments where the header length is constant, this field is unnecessary. The total PDU length field 204, which is also optional, stores information about the total size of the header plus the size of the attached data. The information allows the network to crosscheck the result of the data transmission. The PDU-sent count field 206 provides information that can be used to indicate the number of incoming TLPDUs. The flag field 208 may be used to store state information.

Figure 4:
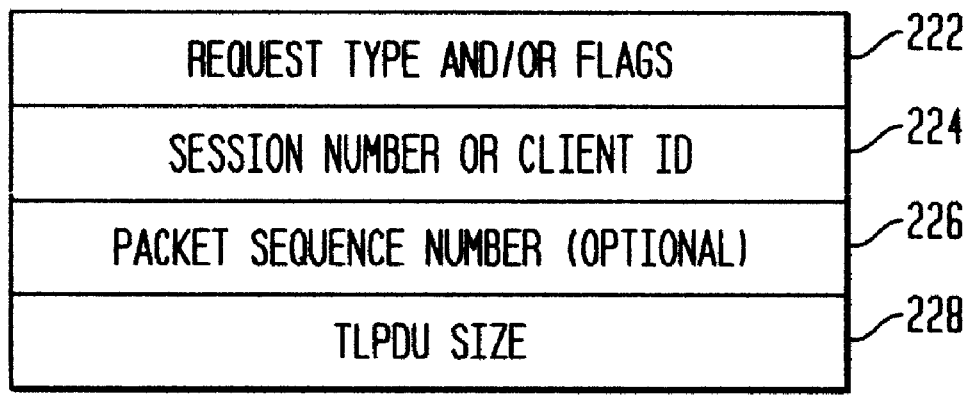
FIG. 4 is a block diagram illustrating one embodiment of a protocol data unit of FIG. 3.

An exemplary data structure of the TLPDU 210 is shown in more detail in FIG. 4. The TLPDU 210 contains a field 222 for storing one or more flags such as a request type flag. Also, the TLPDU 210 contains a field 224 for storing a session number or client identifier. A field 226 stores packet sequence number information, while a field 228 stores the TLPDU size information. The optional field 226 is useful in reassembling the packets into a predetermined sequence, when more than one transport is used. The field 228 provides more information on the TLPDU size.

Figure 5:
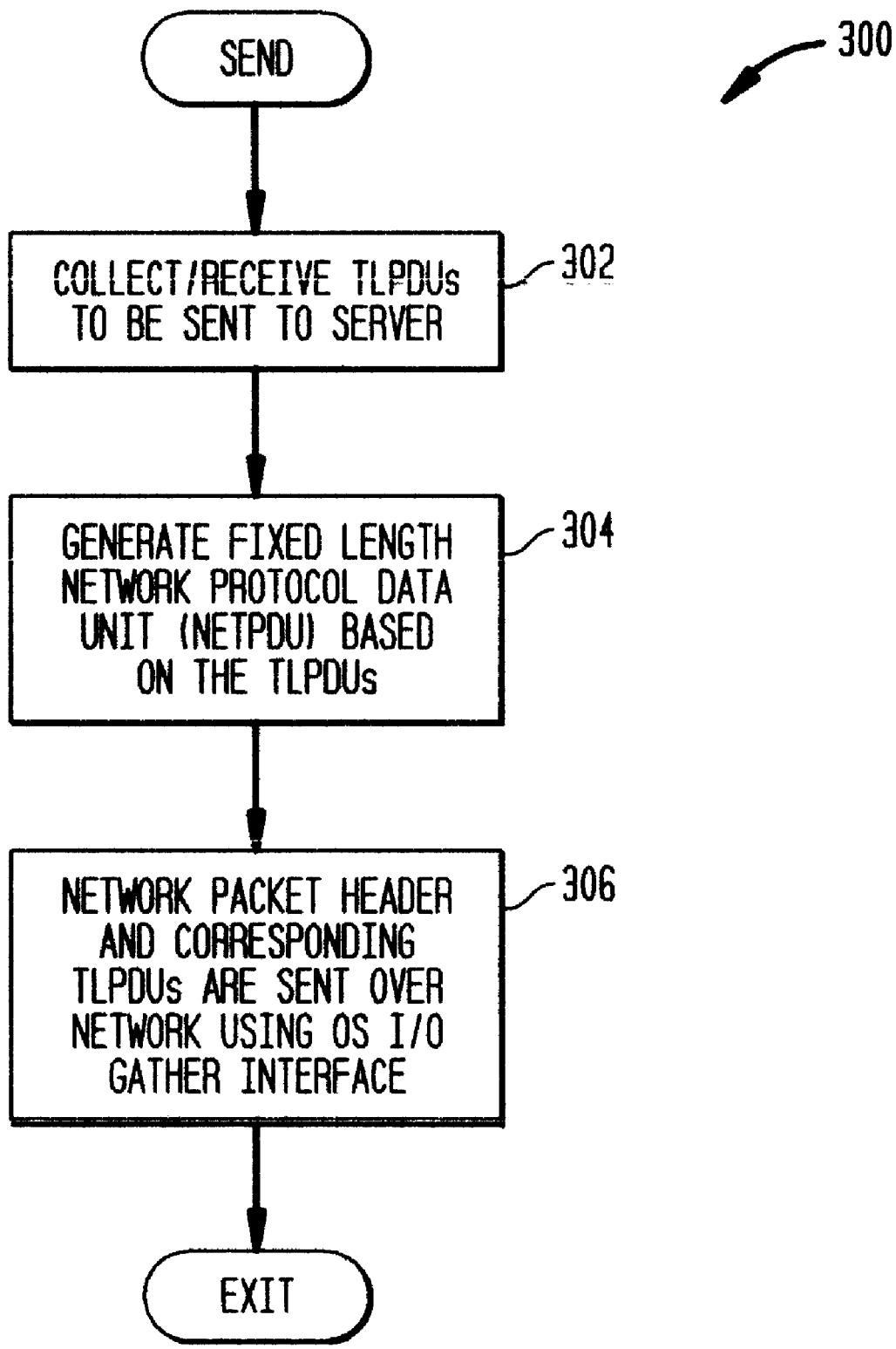
FIG. 5 is a flowchart illustrating a process to send or write an aggregate network packet.

Referring now to FIG. 5, a send process 300 is shown for sending or writing an aggregated network packet. The process 300 first collects or receives TLPDUs to be sent to a server (step 302). This step can be implemented using one or more dedicated threads to receive incoming packets and usher the packets into a queue. The queued packets are then aggregated. Next, the process 300 generates a fixed length network protocol data unit (NetPDU) or packet based on the queued TLPDUs (step 304). If more than one transport is available, the process 300 then finds a free or idle transport stream. Finally, the network packet header and corresponding TLPDUs are sent over the network using an operating system input output gather interface call (step 306). The corresponding pseudocode to send/write an aggregate network packet is as follows:

1) Collect/Receive all TLPDUs to be sent to the server.
2) Generate the fixed length NETPDU or packet header based upon the above TLPDUs.
3) Send the network packet header NETPDU followed by the TLPDU on the chosen transport.
4) The network packet header and the corresponding TLPDUs can be sent over the network using the OS provided IO gather interface (example: writev( )).

Figure 6:
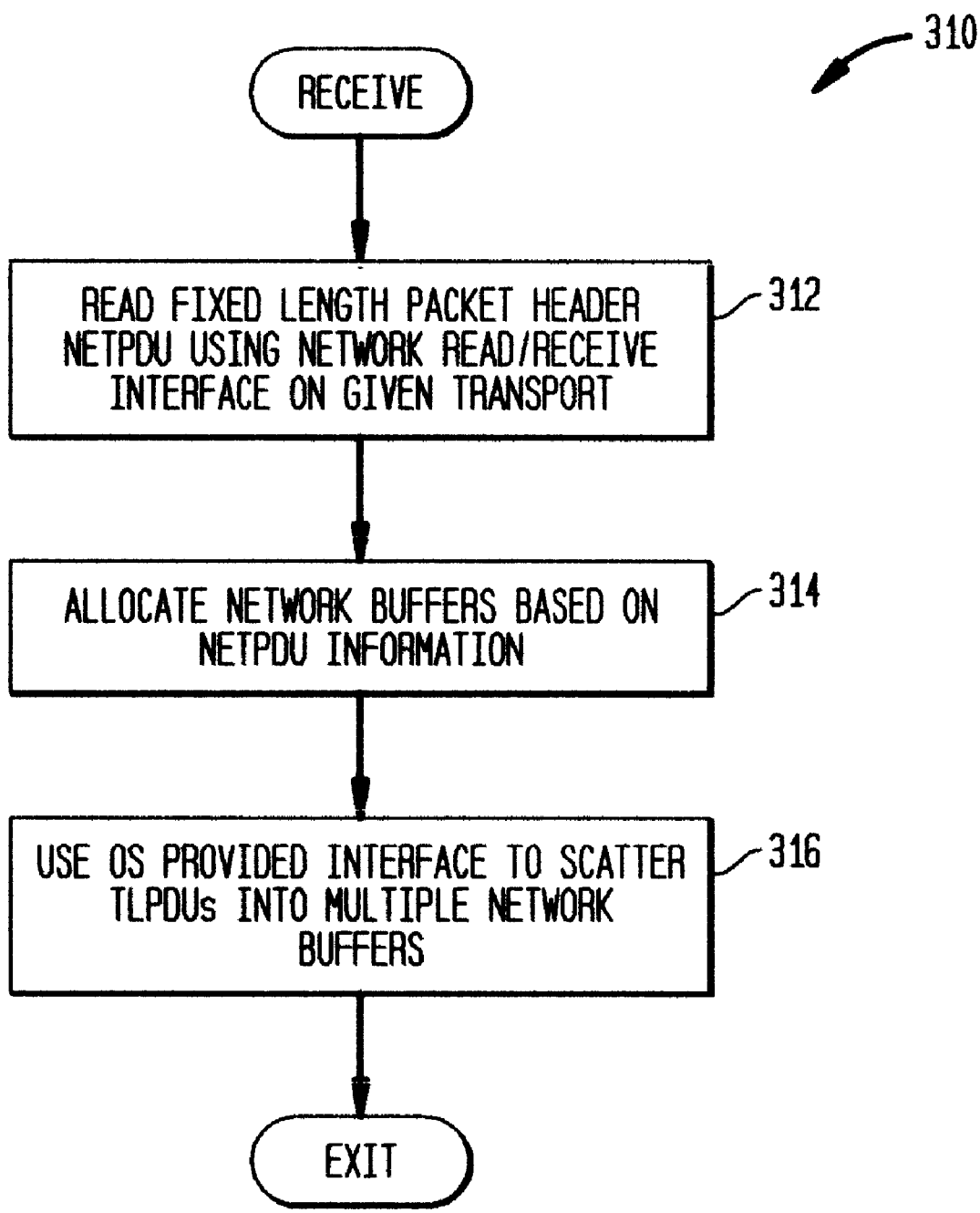
FIG. 6 is a flowchart of a process for receiving or reading an aggregate network packet.

Referring now to FIG. 6, a process 310 for receiving or reading an aggregate network packet is shown. First, the process 310 reads a fixed length packet header NetPDU using a network read or receive interface on a given transport (step 312). Next, the process 310 allocates one or more network buffers based on the NetPDU information extracted from the header section (step 314). Finally, the process 310 uses an operating system provided scatter/gather interface to distribute the TLPDUs into multiple network buffers (step 316). The pseudocode to receive/read an aggregate network packet is as follows:

1) Read the fixed length packet header NETPDU using the traditional network read/recv interface on the given transport. One additional communication read/receive will be necessary for reading in the aggregated packet header for each aggregated packet.
2) Allocate network buffers based on the information contained in the NETPDU.
3) Use the OS provided scatter interface (example: readv( ) system call) to scatter the actual user data or TLPDUs into the multiple network buffers.

Figure 7:
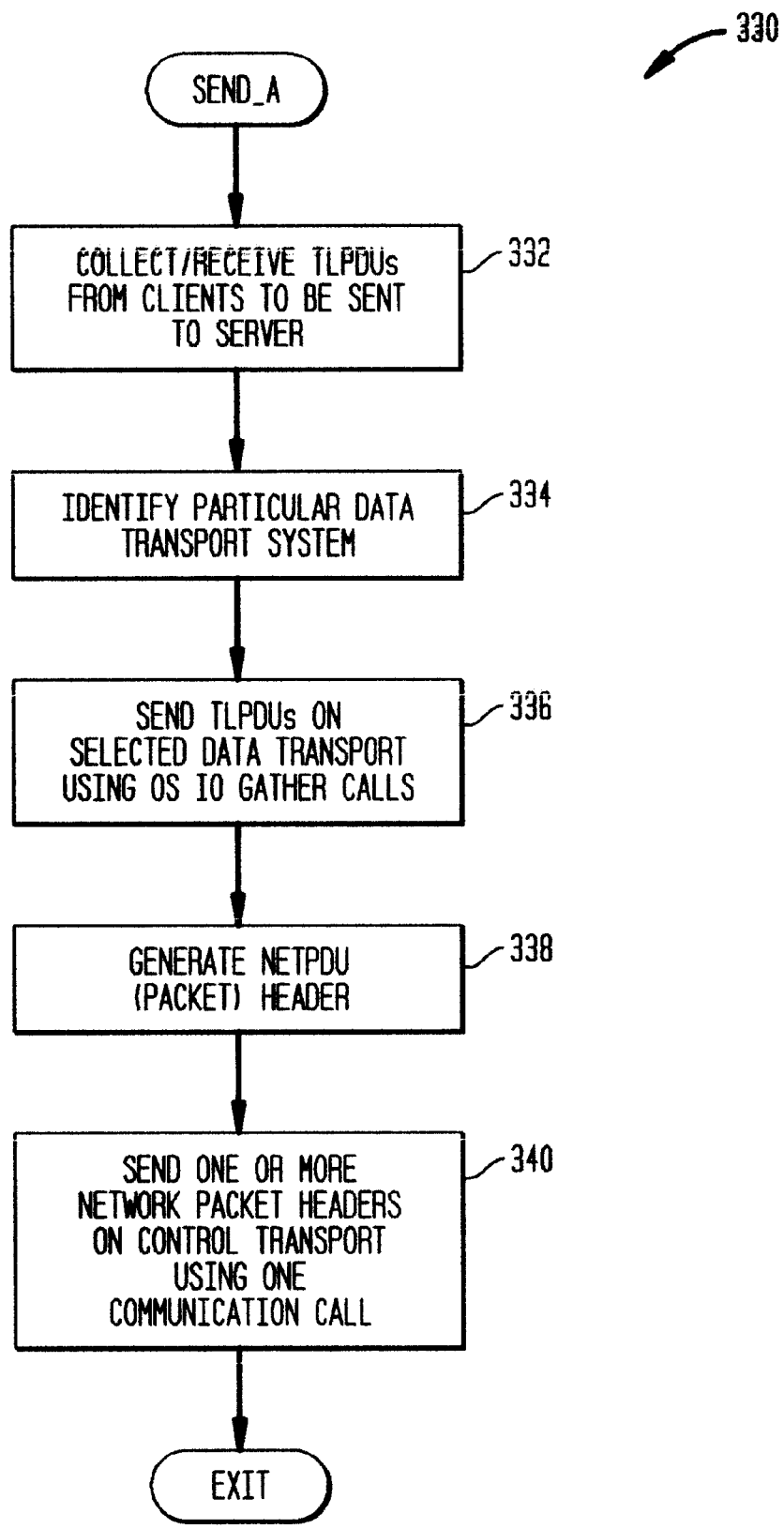
FIG. 7 is a second embodiment of a process for sending or writing an aggregate network packet.
Figure 8:
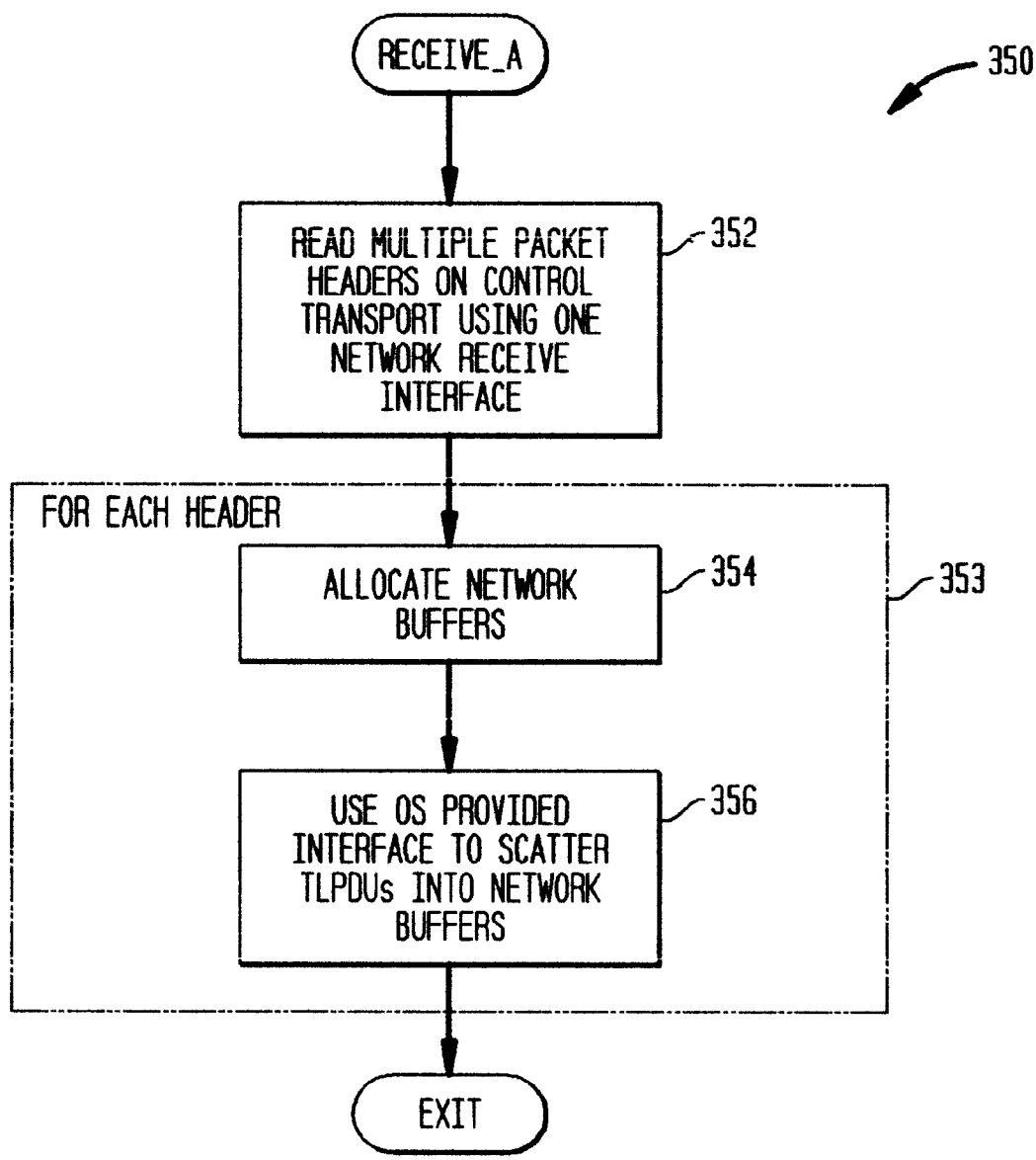
FIG. 8 is a second embodiment of a process for receiving or reading an aggregate network packet.

Turning now to FIGS. 7–8, the processes shown therein implement a second protocol where one or more dedicated control transports are used for exchanging packet headers only. In other words, multiple NetPDUs are further aggregated and sent over the dedicated control transport(s) to the server to reduce the number of read/receive OS communication calls required for receiving multiple packet headers. Due to use of dedicated control transports, the packet header (NetPDU) can now be of variable length for even better utilization of network bandwidth. Through the second protocol, the server polls fewer control transports. If the number of control transports is small then the poll on the control transport can be reduced to a blocking or non-blocking network read/receive OS call. Thus, the cost of using an IO multiplexing interface in the server (example: Select( ) or Poll( )) can be reduced or even eliminated. In this embodiment, the NetPDU contains information on which data transport the corresponding TLPDUs was sent on.

Referring now to FIG. 7, a second send process 330 is shown. In this process, TLPDUs are collected or received from various clients and consolidated before they are sent to a server (step 332). Next, a particular data transport system is identified (step 334). The TLPDUs are then sent on the selected data transport system using the operating system input output gather calls (step 336). The process 330 then generates one or more NetPDU packet headers (step 338). The network packet header NetPDU 340 are sent on a control transport using one communication call (step 340). The pseudocode to send/write an aggregate network packet is as follows:

1) Collect/Receive all TLPDUs from Clients to be sent to the server.
2) Identify a particular Data Transport to be used for sending the TLPDUs.
3) Send the TLPDUs on the chosen Data Transport using the OS provided IO gather interface (example: writev( ))
4) Generate a NETPDU or packet header based upon the above TLPDUs and chosen transport ID.
5) Send the network packet header NETPDU on the Control Transport using 1 send/write communication call.

Alternatively, the NETPDU can also be enqueued into a header queue to aggregate the headers to reduce transmission overhead.

Turning now to FIG. 8, a second embodiment of the receive or read process 350 is shown. The process 350 first reads the plurality of packet headers on the controlled transport using a network receive interface call (step 352). Next, for each header, the following operations are performed (step 353): one or more network buffers are allocated in accordance with the subpackets contained therein (step 354), and the operating system provided interface on the data transport is used to distribute the TLPDUs into the allocated network buffers (step 356). The pseudo code to Receive/Read an aggregate network packet is as follows:

1) Read multiple packet headers (NETPDUs) on the Control Transport(s) using 1 network read/receive interface.
2) For each header:
3) Allocate network buffers based on the information contained in the given NETPDUs.
4) Use the OS provided scatter interface (example: readv( ) system call) to scatter the actual user data or TLPDUs into the various network buffers from the given Data Transports.

The processes of FIGS. 7–8 receive multiple NetPDUs or packet headers on a dedicated control transport using a single communication read/receive call. The use of a dedicated control transport to send/receive packet headers allows the server to avoid using the expensive IO multiplexing interfaces (example: select( ) or poll( ) system calls). The cost of receiving network packet headers is reduced, thus improving the efficiency of packet aggregation. Moreover, these processes enable user/application level I/O multiplexing without using the OS provided I/O multiplexing interfaces. Additionally, the variable length packet headers keeps the packet header overhead (in terms of number of bytes of additional data transferred) to a minimum.

Figure 9:
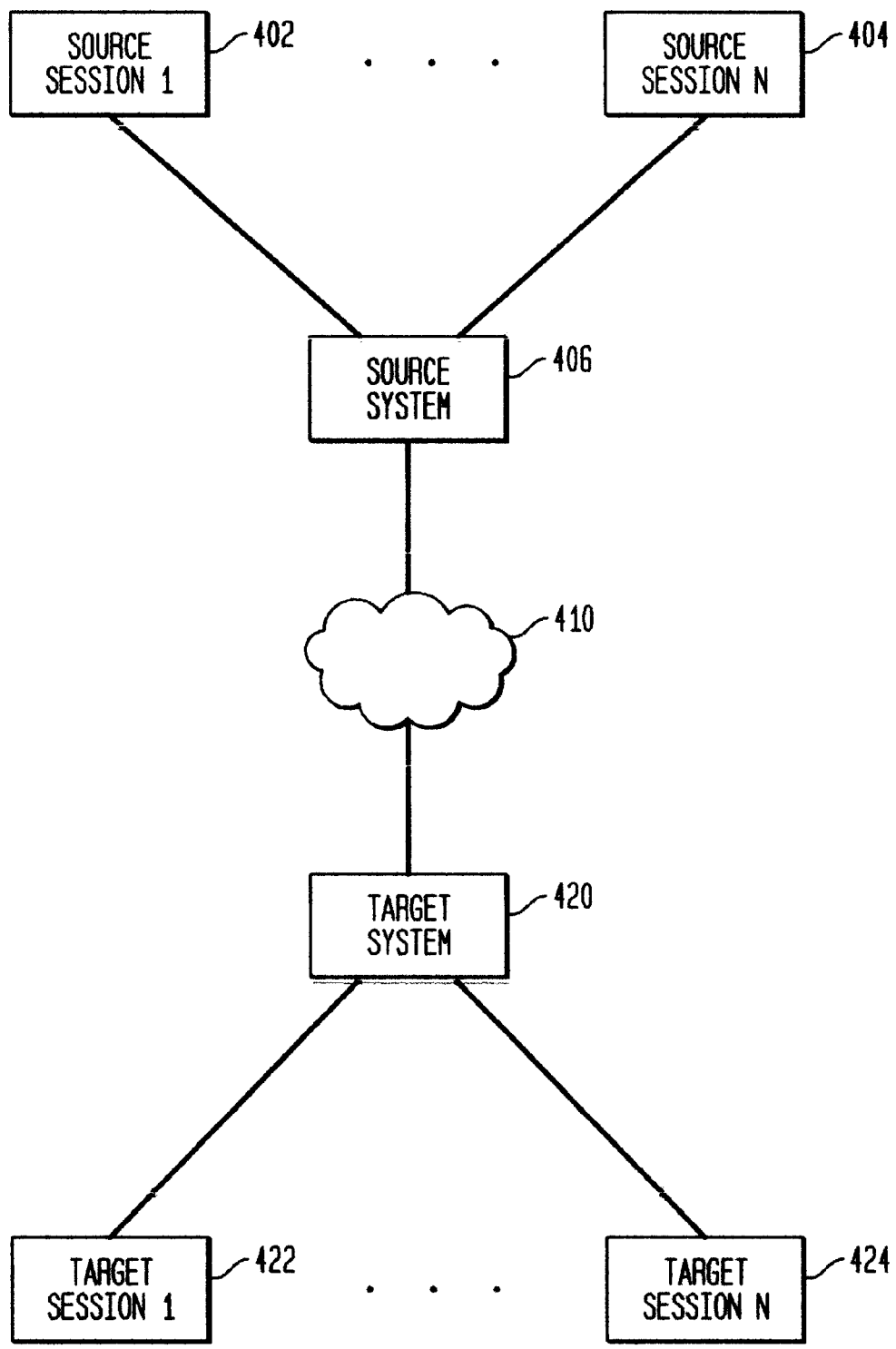
FIG. 9 is a diagram illustrating a wide area network system with the network packet aggregation performed in FIGS. 1–8.
Figure 10:
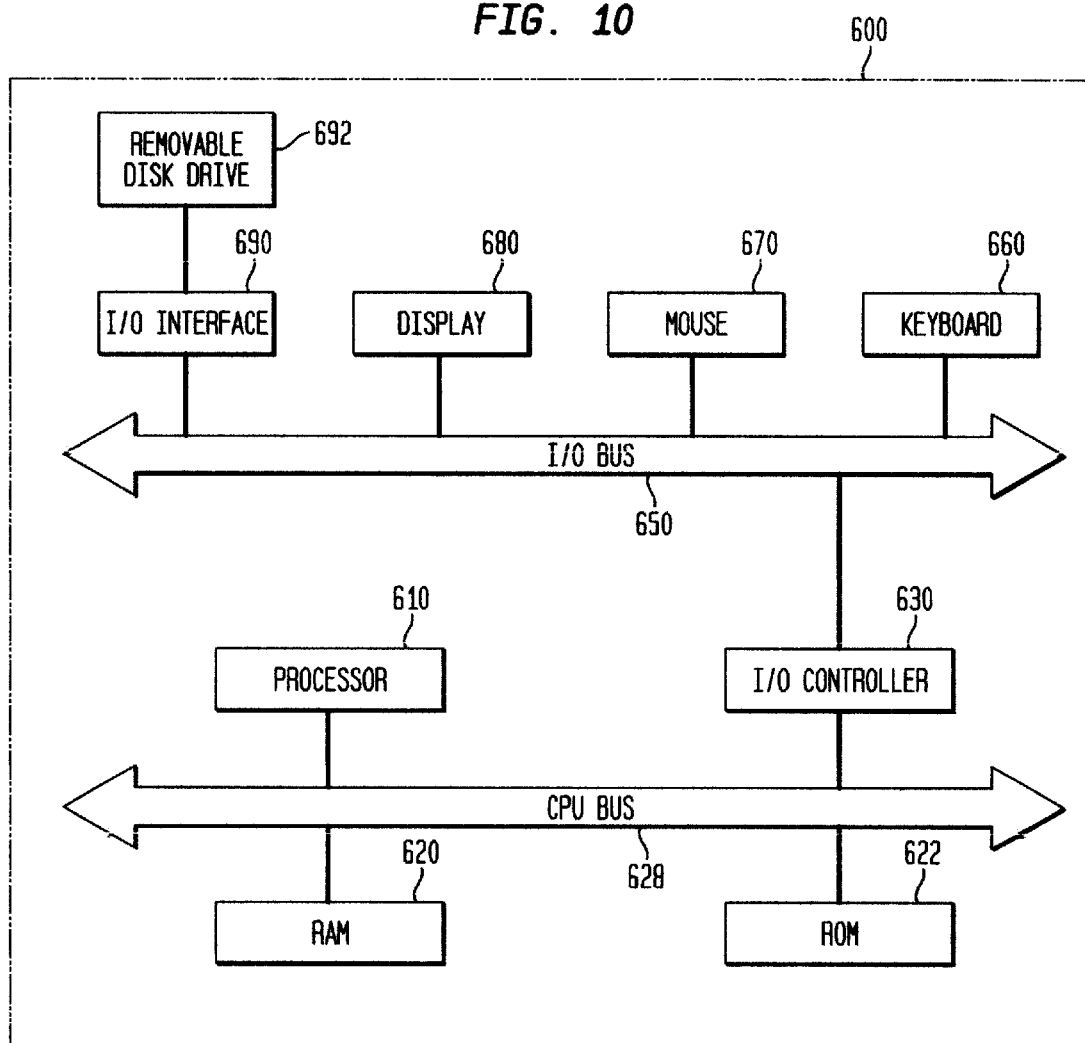
FIG. 10 is a schematic diagram of a computer for supporting packet aggregation.

FIG. 9 shows an architecture which takes advantage of the network packet aggregation system discussed above. The system 400 has a plurality of source or client sessions 402 and 404 which need to communicate data to one or more target sessions 422 and 424 over a network 410. The data from the source session 402 and 404 are collected at a source system 406 which aggregates the data in performing an efficient network packet aggregation across client sessions. The source system 406 consolidates the data from the data source sessions 402 and 404 and transmits the resulting data over the network 410 to a target system 420. The target system 420 in turn distributes the data associated with each session in accordance to the processes discussed above. The packet aggregation can also be cascaded, that is, a cascaded session can aggregate data from a previously aggregated session and forward the aggregated packet to a concentrator downstream which in turn performs additional aggregation on the aggregated packets in a cascaded fashion. In FIG. 9, the source system 406 can be a transient target system for another source system. In such a configuration, the concentrators can have an inverted tree configuration.

The protocols discussed above are also applicable to aggregating packets at the TCP/IP layer. In this context, many Unix operating systems provide STREAMS multiplexors, which are software device drivers to route messages between different streams. These multiplexors can be used to isolate the transport connection's stream from the network connection's stream. TCP and UDP protocols are implemented as many-to-one multiplexors while IP is implemented as a many-to-many multiplexor.

The packet aggregation can be done in the context of STREAMS based TCP/IP using an aggregate STREAMS multiplexor which is positioned between TCP and IP drivers.

A corresponding peer driver is also used on a target host to split and reroute the aggregated messages correctly. The STREAMS driver receives inputs from TCP and then aggregates the packets going to the same IP address. The aggregated packet will be then routed to the IP driver.

As packets are encapsulated, the IP protocol would not be aware of the packet aggregation. On the target host, the IP routes the aggregated packet to a new peer driver, which will take the aggregated packet from IP driver, split and route the packet as specified by the aggregated packet header.

The protocols discussed above significantly reduce the number of operating system communication calls. Correspondingly, the number of communication calls necessary to send and receive a given number of network packets between the source system (concentrator) and the target system (server) processes across the network is also reduced due to packet aggregation. The resource requirements of the server process will be reduced proportional to amount of average aggregation measured. The reduced number of communication calls needed in the Server will improve the scalability of the server in a client-server architecture. For small sized packets, packet aggregation helps improving the network bandwidth due to the reduced packet/frame header overhead at the transport or lower layers. Moreover, in networks with large MTU (Maximum Transmission Unit) aggregating small packets reduce communication latency.

The invention may be implemented in digital hardware or computer software, or a combination of both. Preferably, the invention is implemented in a computer program executing in a computer system. Such a computer system may include a processor, a data storage system, at least one input device, and an output device. FIG. 6 illustrates one such computer system 600, including a processor (CPU) 610, a RAM 620, a ROM 622 and an I/O controller 630 coupled by a CPU bus 628. The I/O controller 630 is also coupled by an I/O bus 650 to input devices such as a keyboard 660, a mouse 670, and output devices such as a monitor 680. Additionally, one or more data storage devices 692 is connected to the I/O bus via an I/O interface 690.

Further, variations to the basic computer system of FIG. 6 are within the scope of the present invention. For example, instead of using a mouse as user input devices, a pressure-sensitive pen, digitizer or tablet may be used.

The above described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A method for aggregating data packets communicated between a plurality of source application sessions on a source system and a respective plurality of associated target application sessions on a target system, comprising:

collecting a plurality of source application session data packets from the plurality of source application sessions;

multiplexing the plurality of source application session data packets into an aggregated source data packet;

adding, to the aggregated source data packet, information required for demultiplexing the aggregated source data packet into its corresponding plurality of source application session data packets for delivery to the associated plurality of target application sessions in the target system; and sending the aggregated source data packet from the source system to the target system.

2. The method of claim 1, further comprising:

reading an aggregated source data packet header for the aggregated source data packet;

allocating a plurality of network buffers based on the information contained in the aggregated source data packet header; and respectively scattering the plurality of source application session data packets from the source data packet into the plurality of network buffers.

3. The method of claim 1, further comprising:

generating an aggregated source data packet header based on the plurality of source application session data packets; and sending the aggregated source data packet header and the plurality of source application session data packets as the aggregated packet on a data transport.

4. A method for aggregating data packets communicated between a plurality of source application sessions on a source system and a respective plurality of associated target application sessions on a target system, comprising:

combining a plurality of source application session data packet headers into an aggregated source data packet header;

sending the aggregated source data packet header over a control transport;

combining a plurality of source application session data packets into an aggregated source data packet; and sending the aggregated source data packet over a data transport.

5. The method of claim 1, further comprising:

receiving the aggregated source data packet header from the control transport; and for each source application session data packet header received from the aggregated source data packet header:

allocating one or more network buffers based on the aggregated packet header;

receiving the aggregated source data packet from the data transport; and scattering the aggregated source data packet into the one or more network buffers based on information from the aggregated source data packet header.

6. A system for aggregating data packets communicated between a plurality of source application sessions on a source system and a respective plurality of associated target application sessions on a target system, comprising:

means for combining a plurality of source application session data packet headers into an aggregated source data packet header;

means for sending the aggregated source data packet header over a control transport;

means for combining a plurality of source application session data packets into an aggregated source data packet; and means for sending the aggregated source data packet over a data transport.

7. The system of claim 6, further comprising:

means for receiving the aggregated source data packet header from the control transport; and means for performing the following steps based on information received from each source application session data packet header received from the aggregated source data packet header:

allocating one or more network buffers based on the aggregated packet header;

receiving the aggregated source data packet from the data transport; and scattering the aggregated source data packet into the one or more network buffers based on information from the aggregated source data packet header.

8. The system of claim 6, wherein means for multiplexing the plurality of source application session data packets into an aggregated source data packet is cascaded.

9. The system of claim 8, wherein the cascaded means for multiplexing the plurality of source application session data packets into an aggregated source data packet comprise means for bundling packets from a previously aggregated session.

10. A computer program product, implemented on a machine readable medium, comprising instructions operable to cause a programmable processor to:

combine a plurality of source application session data packet headers into an aggregated source data packet header;

send the aggregated source data packet header over a control transport;

combine a plurality of source application session data packets into an aggregated source data packet; and send the aggregated source data packet over a data transport.

11. The computer program product of claim 10, further comprising instructions operable to cause a programmable processor to:

receive the aggregated source data packet header from the control transport; and for each source application session data packet header received from the aggregated source data packet header to:

allocate one or more network buffers based on the aggregated packet header;

receive the aggregated source data packet from the data transport; and scatter the aggregated source data packet into the one or more network buffers based on information from the aggregated source data packet header.

12. A method for aggregating data packets for transmission from a plurality of source application sessions on a source system to a plurality of associated target application sessions on a target system, each data packet having a data portion and a header portion, comprising:

collecting a plurality of source application data packets from the source system;

aggregating the plurality of source application data packets into an aggregated data packet having a header portion and a plurality of data portions for demultiplexing, by the target system, the plurality of data portions into a respective plurality of target application sessions on the target system based on information in the header portion; and transmitting the aggregated data packet to the target system;

wherein the step of aggregating the plurality of source application data packets is cascaded and a cascaded session transparently aggregates data from a previously aggregated session.

13. A system to aggregate data packets communicated between a plurality of source application sessions on a source system and a respective plurality of associated target application sessions on a target system, comprising:

means for collecting a plurality of source application session data packets from the plurality of source application sessions;

means for multiplexing the plurality of source application session data packets into an aggregated source data packet and for including information to enable demultiplexing, at the target system, the aggregated source data packet into its corresponding plurality of source application session data packets for delivery to the associated plurality of target application sessions on the target system;

means for sending the aggregated source data packet from the source system to the target system;

means for reading an aggregated source data packet header for the aggregated source data packet;

means for allocating a plurality of network buffers based on the information contained in the aggregated source data packet header; and means for respectively scattering the plurality of source application session data packets from the aggregated source data packet into the plurality of network buffers.

14. The system of claim 13, further comprising:

means for generating an aggregated source data packet header based on the plurality of source application session data packets; and means for sending the aggregated source data packet header and the plurality of source application session data packets to the target system on a data transport.

15. A computer program product, implemented on a machine readable medium, comprising instructions operable to cause a programmable processor to:

collect a plurality of source application session data packets from a respective plurality of source application sessions;

multiplex the plurality of source application session data packets into an aggregated source data packet;

send the aggregated source data packet from a source system to a target system; and demultiplex the aggregated source data packet into its corresponding plurality of source application session data packets for delivery to an associated plurality of target application sessions on the target system;

generate an aggregated source data packet header based on the plurality of source application session data packets; and send the aggregated source data packet header and the plurality of source application session data packets as the aggregated packet on a data transport to the target system.

16. The computer program product of claim 15, further comprising instructions operable to cause a programmable processor to:

read an aggregated source data packet header for the aggregated source data packet;

allocate a plurality of network buffers based on the information contained in the aggregated source data packet header; and respectively scatter the plurality of source application session data packets from the source data packet into the plurality of network buffers.

\* \* \* \* \*